(12) United States Patent
Allpress et al.

(10) Patent No.: US 9,369,310 B2
(45) Date of Patent: Jun. 14, 2016

(54) EQUALISATION OF A SIGNAL RECEIVED OVER A WIRELESS CHANNEL

(75) Inventors: Stephen Allpress, Bristol (GB); Edward Andrews, Bristol (GB); Simon Huckett, Bristol (GB); Laolu Lijofi, Bristol (GB); Jonathan Peter Lucas, Bristol (GB); Carlo Luschi, Oxford (GB); Simon Nicholas Walker, Bristol (GB)

(73) Assignee: Icera, Inc., Wilmington, DE (US)

( * ) Notice: Subject to any disclaimer, the term of this patent is extended or adjusted under 35 U.S.C. 154(b) by 453 days.

(21) Appl. No.: 13/350,259

(22) Filed: Jan. 13, 2012

(65) Prior Publication Data
US 2012/0183037 A1 Jul. 19, 2012

(30) Foreign Application Priority Data
Jan. 14, 2011 (GB) .................................. 1100623.6

(51) Int. Cl.
*H04B 1/10* (2006.01)
*H04L 25/02* (2006.01)
*H04L 25/03* (2006.01)

(52) U.S. Cl.
CPC ...... *H04L 25/0212* (2013.01); *H04L 25/03019* (2013.01)

(58) Field of Classification Search
CPC .................. H04L 2025/03585; H04L 25/0216
USPC ........................................ 375/152, 232, 350
See application file for complete search history.

(56) References Cited

U.S. PATENT DOCUMENTS

| 5,251,237 | A  | * | 10/1993 | Baier | 375/346 |
| 5,636,244 | A  | * | 6/1997 | Goodson et al. | 375/231 |
| 6,466,616 | B1 | * | 10/2002 | Stenstrom et al. | 375/233 |
| 7,085,317 | B2 | * | 8/2006 | Malladi et al. | 375/232 |
| 8,340,170 | B2 | * | 12/2012 | Dawid et al. | 375/230 |
| 2003/0078025 | A1 | * | 4/2003 | Smee et al. | 455/307 |
| 2003/0133424 | A1 | * | 7/2003 | Liang et al. | 370/335 |
| 2005/0036541 | A1 | * | 2/2005 | McKown | 375/233 |
| 2008/0063042 | A1 |   | 3/2008 | Tsuie et al. | |
| 2008/0175328 | A1 | * | 7/2008 | Lin et al. | 375/260 |
| 2008/0292004 | A1 | * | 11/2008 | Markman et al. | 375/240.28 |
| 2009/0110036 | A1 | * | 4/2009 | Luschi et al. | 375/148 |
| 2010/0158089 | A1 | * | 6/2010 | Ki et al. | 375/224 |
| 2012/0075958 | A1 | * | 3/2012 | Hintz | 367/125 |
| 2013/0031151 | A1 | * | 1/2013 | Hollis | 708/270 |

FOREIGN PATENT DOCUMENTS

| EP | 0954142 A1 | 3/1999 |
| WO | WO0243271 A2 | 5/2002 |
| WO | WO02082711 A1 | 10/2002 |

(Continued)

*Primary Examiner* — Shuwang Liu
*Assistant Examiner* — Sung Ahn

(57) ABSTRACT

An apparatus, method and program for processing a signal received over a wireless channel. The apparatus comprises: a channel searcher configured to determine a profile of the channel in the form of energy values for a plurality of rays at respective channel positions, and an equalizer for equalizing the signal based on a variable window of the equalizer. The channel searcher is configured to estimate dispersion of the channel by determining a measure of variance of ray distance from a reference position within the channel profile weighted by ray energy. The equalizer is coupled to the channel searcher and arranged to adapt the window in dependence on the measure of energy-weighted ray distance variance.

40 Claims, 2 Drawing Sheets

(56) References Cited

FOREIGN PATENT DOCUMENTS

| WO | WO02103972 | A1 | 12/2002 |
| WO | WO2004047389 | A1 | 6/2004 |
| WO | WO2004075497 | A1 | 9/2004 |
| WO | WO2009056499 | A2 | 5/2009 |
| WO | WO2009121795 | A2 | 10/2009 |

* cited by examiner

EQUALISATION OF A SIGNAL RECEIVED OVER A WIRELESS CHANNEL

CROSS REFERENCE RELATED APPLICATION

This application claims the benefit of GB Application No. 1100623.6 filed on Jan. 14, 2011, entitled "Equalisation of a Signal Received over a Wireless Channel," by Allpress, et al. The above application is commonly assigned with this application and is incorporated herein by reference in its entirety.

FIELD OF THE INVENTION

The present invention relates to a method, program and apparatus for equalising a signal received over a wireless channel so as to remove or at least mitigate an effect of the channel. Particularly, the invention relates to a variable length equaliser.

BACKGROUND

Referring to FIG. 1, when a transmitting apparatus 102 transmits a signal wirelessly over a channel h(t) to a receiving apparatus 104, the signal becomes spread out in time due to the effects of the channel. As will be familiar to a person skilled in the art, this is typically due in large part to the signal propagating via multiple paths of differing length, e.g. due to the signal bouncing via buildings or geographical features. The channel h(t) is sometimes understood by considering what would happen if an infinitesimally narrow unit impulse (delta function) was input into the channel by the transmitter 102. In that case, the signal as initially received at the receiving apparatus 104 would have its energy spread out over time according to some function h(t) depending on the channel in question. This effect is shown schematically in FIG. 2. If not corrected for, this will inevitably have a deleterious effect on the ability to receive meaningful data.

To address this problem, the receiving apparatus comprises an equaliser 106 coupled to a receive antenna via a suitable radio frequency (RF) front-end (not shown). The equaliser 106 is in effect a filter designed to attempt to apply an inverse $h^{-1}(t)$ to the received signal and thereby remove or at least mitigate the effect of the channel. Of course in a real digital system the inverse of the channel has to be approximated using a finite number of discrete filter coefficients to process a finite number of discrete samples. That is:

$$y_k = \sum_{\ell=0}^{L} w_\ell r_{k-\ell}$$

where k is an integer index denoting the sample number currently being output by the equaliser, $y_k$ is the corresponding output for the $k^{th}$ output sample, $l=0 \ldots L$ are integer indices denoting nearby received samples which contribute to $y_k$ due to the non-instantaneous nature of the channel, $r_{k-1}$ is the corresponding input sample, and $w_1$ is the corresponding weight quantifying the amount of the contribution from the respective received sample. The sample indices correspond to certain unit time intervals, e.g. chips of a CDMA system or fractions of chips if over-sampled. The received samples $l= 0 \ldots L$ together represent a certain window of samples over which the received contribution from the channel is considered non-negligible, i.e. for any given output the equaliser only processes the contribution from input samples within the time window L (potentially the effect of the channel stretches away indefinitely in time but beyond a certain point becomes negligible). In this case the window in question may sometimes be referred to as the equalisation length.

One way in which the performance of an equaliser can be improved is to provide an adaptive equalisation length or other such adaptive window which is varied in dependence on channel conditions. Existing applications that disclose this are WO 2009/056499 and WO 2009/121795.

These vary the equaliser length by reducing (or increasing) the number of weight coefficients w used in the final filter, or equivalently the number L of received samples r over which the equalisation is performed. This amounts to varying the length of the filter estimating the inverse of the channel.

It is also possible to perform at least part of the equalisation in the frequency domain by applying a discrete Fourier transform, in which case an alternative way of varying the equaliser length may involve varying the number of frequency domain coefficients.

Another way of adapting a window used in an equaliser is to vary the channel length over which the channel is initially estimated for the purpose of calculating the w coefficients used in the equaliser filter (e.g. see WO 2009/121795, page 18, lines 12-31). That is, rather than (or in addition to) varying the number of coefficients w used to process samples in the filter, it is alternatively or additionally possible to vary the length over which the channel is considered significant for the purpose of calculating the w vector in the first place (i.e. for calculating the inverse of the channel). This window is also a feature of the equaliser and also has an effect on the complexity and/or power. The length of this equalisation window can also be adapted dynamically based on channel conditions.

SUMMARY

The idea of varying an equaliser window is therefore understood in the art. However, the current documentation only refers to performing such adaptation based on relatively simplistic measures of the channel such as the amount of channel energy falling outside of a fixed range. Whilst such measures can be used to improve the equalisation to some extent, there is still scope for improvement.

If the equalisation window is too narrow then the equaliser will not adequately compensate for the channel, leading to an increased error rate. On the other hand, it is not desirable to include too many received samples in the equalisation window as this will increase the number of processing cycles incurred by the equaliser (in a soft implementation) and also the power consumed by the equaliser (in either a soft or a hard implementation).

Furthermore, if the equalisation window is in fact too wide then as well as incurring undue power and/or processing cost, the noise from the furthest samples (which contain no part of the signal at all) will reduce the quality of the equaliser output by introducing extra noise whilst having no worthwhile contribution to the equalisation process itself.

It would be desirable to find a measure of dispersion of the channel which allows for an improved adaptation of the equalisation window.

According to one aspect of the present invention, there is provided an apparatus for processing a signal received over a wireless channel, comprising: a channel searcher configured to determine a profile of the channel in the form of energy values for a plurality of rays at respective channel positions; and an equaliser for equalising the signal based on a variable window of the equaliser; wherein the channel searcher is configured to estimate dispersion of the channel by determining a measure of energy-weighted ray-distance variance, being a measure of variance of ray distance from a reference position within the channel profile weighted by ray energy; and the equaliser is coupled to the channel searcher and arranged to adapt the window in dependence on said measure of energy-weighted ray-distance variance.

In embodiments, the reference position may be a mid point of the channel profile. The mid point may be the energy centroid of the channel profile.

The equaliser may be configured to adapt the window based on an approximated model that the energy of the channel follows a probability distribution having a predetermined form and being parameterised by said measure of energy-weighted ray-distance variance, the window corresponding to a width of the parameterised probability distribution beyond which less that a predetermined proportion of the channel energy falls. The predetermined form may be that of a Gaussian distribution.

The channel searcher and equaliser may be configured to repeat said determination of channel profile, determination of energy-weighted ray-distance variance and adaptation of the window dynamically throughout ongoing receipt and equalisation of the signal so as to adapt the equaliser to changing channel conditions.

The channel searcher may be configured to discard outlying rays from said profile before measuring the energy-weighted ray-distance variance.

The channel searcher may be configured to discard outlying rays from said profile before measuring the energy centroid.

The apparatus may comprise a filter arranged to filter the measure of energy-weighted ray-distance variance before used to adapt the window.

The apparatus may comprise a filter arranged to filter the energy centroid before used to determine said measure of energy-weighted ray-distance variance.

The filter may have the form $f_{m+1}=C(f_m+d_{m+1})$ where $f_{m+1}$ an updated state of the filter, $f_m$ is the state of the filter preceding the updated state, $d_{m+1}$ is an updated measure of the energy-weighted ray-distance variance or energy centroid as appropriate, and C is a predetermined factor being less than one. C may be substantially equal to $19/20$. C may be dynamically adapted based on a Doppler estimate.

The channel searcher may be arranged to determine the channel profile based on a convolution of the received signal with a pilot signal.

The apparatus may comprise a storage medium and a processing apparatus, wherein the equaliser and channel searcher may comprise program code stored on the storage medium and arranged for execution on the processing apparatus.

According to another aspect of the present invention, there is provided a method of processing a signal received over a wireless channel, comprising: determining a profile of the channel in the form of energy values for a plurality of rays at respective channel positions; and equalising the signal based on a variable window; estimating dispersion of the channel by determining a measure of energy-weighted ray-distance, being a measure of variance of ray distance from a reference position within the channel profile weighted by ray energy; and adapting the window in dependence on said measure of variance.

According to another aspect of the present invention, there may be provided a corresponding computer program product comprising code embodied on a non-transient computer-readable medium and configured so as when executed to perform the above method.

In embodiments, the method and/or computer program may be further configured to perform operations in accordance with any of the above apparatus features.

BRIEF DESCRIPTION OF THE DRAWINGS

For a better understanding of the present invention and to show how it may be put into effect, reference will be made by way of example to the accompanying drawings in which.

DETAILED DESCRIPTION OF PREFERRED EMBODIMENTS

Figure 3:
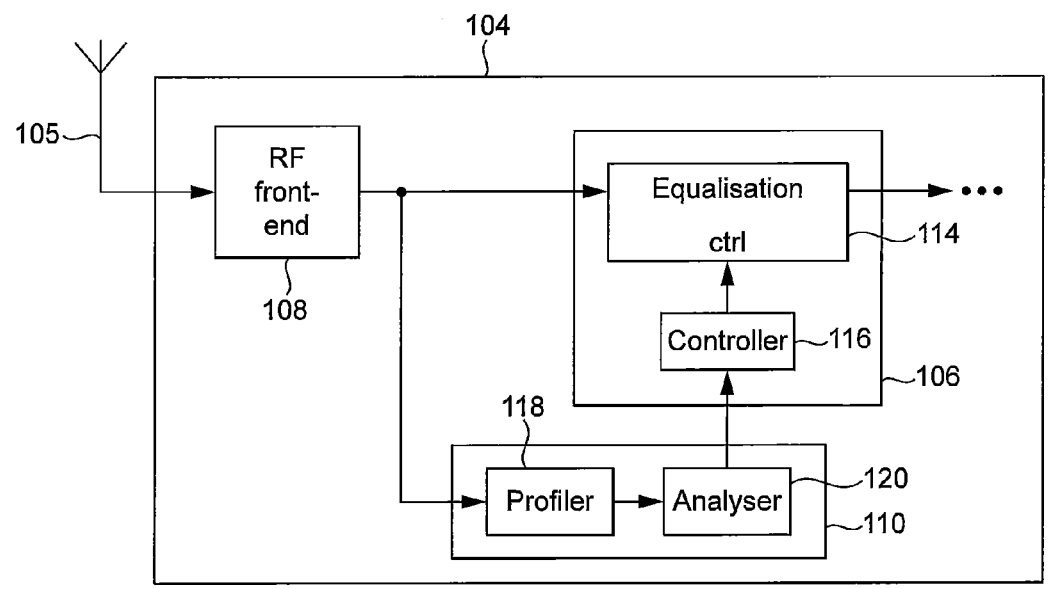
FIG. 3 is a schematic block diagram of a receiving apparatus.

FIG. 3 provides a schematised block diagram of a receiving apparatus 104 according to a preferred embodiment of the present invention. The apparatus 104 comprises at least one antenna 105, an RF front-end 108, an equaliser 106, and a channel searcher 110. The equaliser 106 comprises an equalisation module 114 for performing the actual equalisation operation, and a controller 116 for varying the equalisation window used by the equalisation module 114. The channel searcher 110 comprises a channel profiler 118 and an analyser 120.

The RF front-end 108 has an input coupled to the antenna 105 and is thereby arranged to accept signals received wirelessly over the wireless channel via the antenna 105. The RF front-end 108 comprises an analogue to digital converter arranged to convert the received signals to a digital signal and a mixer arranged to down-convert the signal from radio frequency to baseband frequency. The RF front-end 108 then has an output coupled to a signal input of the equalisation module 114, and is thereby arranged to supply a received signal in digital baseband form to the equalisation module 114 of the equaliser 106 to be equalised. The signal may comprise a data signal carrying user content, e.g. the HSDCH in a 3GPP system. The equalisation module 114 also has a control input (ctrl) coupled to an output of the controller 116, thereby enabling the controller 116 to dynamically alter the equalisation length L used by the equalisation module 114.

The output from the RF-front-end 108 is also coupled so as to supply a received pilot signal to an input of the profiler 118, e.g. the CPICH in a 3GPP system (a pilot signal provides a known reference allowing information about the channel to be determined, whereas the signal supplied to the equaliser may comprise a data signal). The profiler has an output coupled to an input of the analyser 120 and is thereby arranged to supply information on the channel's energy profile to the analyser 120 where the information is analysed to determine a special measure (the energy-weighted ray-distance variance, discussed shortly) which acts as a measure of the dispersion of the channel. The analyser 120 then has an output coupled to an input of the controller 116 in the equaliser 106 and is thereby arranged to supply this measure of dispersion to the controller 116, which is configured to adapt the equaliser length L in dependence on the supplied measure.

It will be appreciated that other signal processing stages will also be present, such as a demodulator and decoder, but that these are omitted from FIG. 3 for conciseness. Details of such elements will be familiar to a person skilled in the art.

In a preferred implementation the equaliser 106, channel searcher 110 (as well as other signal processing stages) are implemented as software modules stored on a storage medium of the apparatus 104 and arranged to be executed on a processor of the apparatus 104. This kind of implementation is sometimes referred to as a "software modem" or "soft modem". In one particular implementation, the RF-font-end 108 is implemented in a separate dedicated chip and then all stages beyond the conversion of the signal to a digital baseband are implemented in software arranged to be executed on a soft baseband processor. In less preferred implementations however, some or all of the function of the equaliser 106, channel searcher 110 and/or other stages could alternatively be implemented in dedicated hardware modules.

In operation, the profiler 118 in the channel searcher 110 performs a convolution operation between the received pilot signal and the known pilot sequence (i.e. between what was actually received and what it is known was transmitted given that the pilot sequence is a fixed feature of the system design). This allows the profiler 110 to determine a delay profile for the channel as illustrated schematically in FIG. 4.

Figure 1:
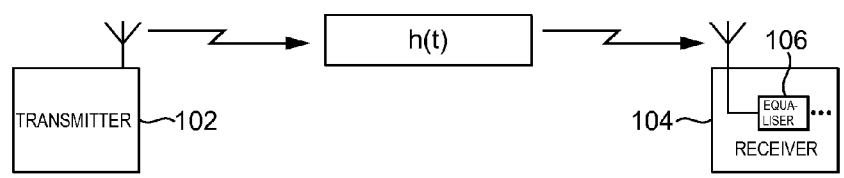
FIG. 1 is a schematic representation of a wireless communication system.
Figure 2:
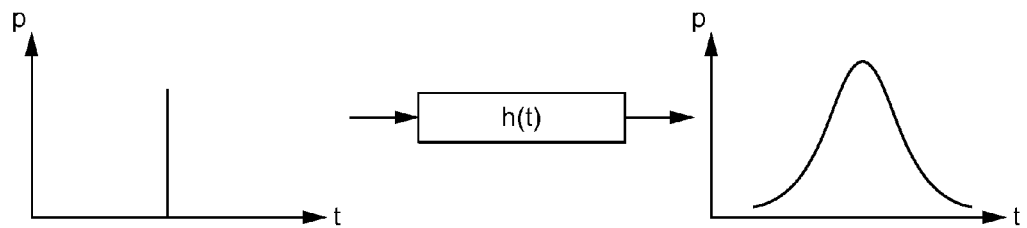
FIG. 2 is a schematic representation of a channel impulse response.
Figure 4:
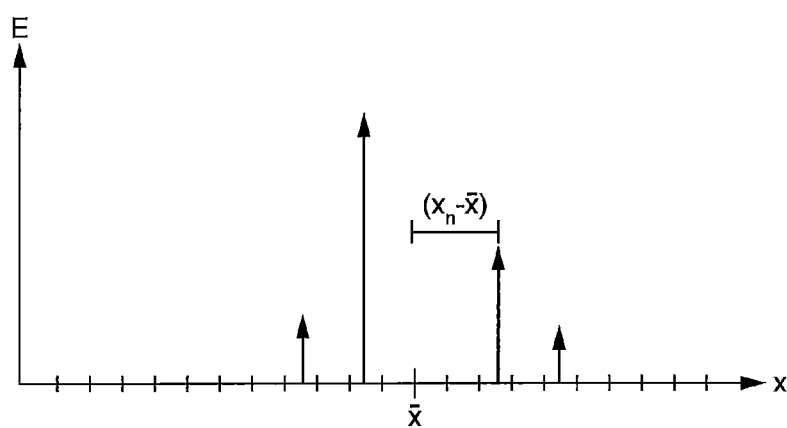
FIG. 4 is a schematic representation of a channel profile.

As shown in FIG. 4, the channel profiler 118 determines how much of the channel's energy occurs in each of a plurality of different discrete delay bins x. Thus the profiler 118 produces a plurality of energy values for a plurality of different respective rays, each corresponding to a different delay values x caused by the signal propagating via different paths (bouncing of buildings, etc.). In a complex environment with many delay paths the actual channel may have a more continuous profile than shown by way of example in FIG. 4 (more like what is shown in FIG. 2), but of course in a digital system the energy will inevitably have to be distributed into discrete bins which will therefore still be considered as discrete rays. The delay bins x correspond to different respective time intervals in which signals can be sampled, such as chips in a CDMA system or fractions of a chip if over sampled.

The analyser 120 uses the information from the profiler 118 to determine a special measure of the dispersion of the channel. This is done by measuring the distance variance of the cell rays weighted by energy. For convenience this may be referred to herein as the energy-weighted ray-distance (EWRD) variance or $\sigma_{EWRD}^2$, and will be discussed in more detail below.

The ray distance is the distance in units of time from a reference point in the channel profile, preferably a measure of a mid-point of the profile such as the energy centroid which is:

$$\bar{x} = \frac{\sum_{n=0}^{N} e_n x_n}{\sum_{n=0}^{N} e_n}$$

where $x_n$ is the position of the $n^{th}$ ray within the channel and e is the energy of the $n^{th}$ ray. So the energy centroid is the sum of the ray positions multiplied by energy, divided by total energy; i.e. the average ray position weighted by energy. This is somewhat analogous to the centre of mass of a physical object—the energy centroid could also be called the centre of energy of the channel. However, other mid points could be used to calculate distance, e.g. the median or the location of the peak energy.

The analyser 120 then calculates the energy-weighted ray-distance (EWRD) variance $\sigma_{EWRD}^2$ so as to provide the desired measure of channel dispersion according to a preferred embodiment of invention. This may be found by:

$$\sigma_{EWRD}^2 = \frac{\sum_{n=0}^{N} e_n(x_n - \bar{x})^2}{\sum_{n=0}^{N} e_n}$$

where $x-\bar{x}$ is the distance of the nth ray from the centroid (or other reference point). So this is the sum of the ray distances squared multiplied by energy, divided by total energy; i.e. the variance of ray distance from a reference position within the channel profile weighted by ray energy.

This variance result is supplied from the analyser 120 to the controller 116, where it can in turn be used by the controller 116 to vary the equalisation length L of the equalisation module 114. Preferably the profiling, analysis and adjustment described above is performed dynamically, i.e. "on the fly" during ongoing receipt and equalisation of a signal by the equalisation module 114. In that manner, the equalisation is able to adapt to changing channel conditions so as to achieve better performance and to avoid wasting power and/or processing cycles. Preferably, the calculation and adjustment of the equalisation window is performed periodically, with a period of the order 1/10 seconds to 10 second, preferably between 1/4 seconds and 2 seconds, as this is the typical amount of time over which channel conditions tend to vary. A period of 1/4 seconds has been found to work particularly well.

The preferred relationship between variance and equalisation window will depend on the particular receiving apparatus and on the communication system generally, and can be determined by simulation.

One exemplary way to configure the relationship is to take a probabilistic approach. This involves first making an assumption that the distribution of the channel's energy can be modelled approximately as following some predetermined probability distribution such as a Gaussian distribution. The Gaussian distribution is a bell curve of probability density with parameters of mean (the centre peak of the curve) and variance $\sigma^2$ or standard deviation $\sigma$ (the width). Using this model and considering $\sigma_{EWRD}^2$ and $\bar{x}$ as the parameters of the bell curve, it is possible to approximate that any received sample $r_{k-1}$ outside of a range from k where less that a predetermined proportion of the channel energy falls according to the model (for example outside of a certain number of standard deviations, e.g. 2 or 3$\sigma$, or outside of a certain central percentage of energy, e.g. outside the central 90% of the curve) would have a negligible or even deleterious effect on the equalisation if its contribution was included when calculating the equaliser output $$y_k = \sum_{\ell=0}^{L} w_\ell r_{k-\ell}.$$

This model then gives a basis for choosing L for a given $\sigma_{EWRD}^2$. The different scenarios may be simulated at system design and relationship between L and $\sigma_{EWRD}^2$ implemented in a look-up table in the controller 116.

The Gaussian is only an approximate model and other probability density functions may also be suitable.

An alternative less preferred approach would be to take a simpler relationship such as L=c·$\sigma^2$ where c is a parameter, and tune c using simulations. In principle any function $L=F(\sigma^2)$ could be trialled and parameterised using such simulations.

In certain embodiments, the technique described above may be improved further by discarding outlying rays from the calculations. For example it may be determined in advance by the system designer that any rays beyond a certain predetermined distance $x-\bar{x}$ from the centroid should not be considered to contribute to the channel for the purpose of calculating the EWRD variance, and/or that any rays outside of a certain range of positions x should not be considered to contribute to the channel for the purpose of the calculation of the energy centroid. If it can be determined that such rays never or rarely have any significant energy, the analyser 120 can be configured to ignore them and thereby avoid including needless processing steps and/or unwanted noise in the calculations.

In further embodiments, a filter may be disposed at the output of the energy centroid calculation and/or at the output of the EWRD variance calculation, to smooth out the reaction of the system to sudden changes. The filter may take the form:

$$f_{m+1}=C(f_m+d_{m+1})$$

where $f_{m+1}$ an updated state of the filter, $f_m$ is the state of the filter preceding the updated state, $d_{m+1}$ is an updated measure of the EWRD variance or energy centroid as appropriate, and C is a predetermined factor being less than one. The index m represents the cycle of calculation and adaptation of the equalisation window (i.e. m+1 represents the next time after m that controller re-adjusts or considers re-adjusting the equalisation window, e.g. once every ¼ second). In a particularly preferred embodiment a nineteen-twentieths filter is used where $C=19/20$.

The effect of such a filter is to prevent the system over reacting to temporary loss of detection of rays due to fading. However, using a 19/20 filter or such like, the output of the calculation will only change by an amount of an order 1/20 or less, and only a sustained trend over a number of calculation cycles will have a significant effect. Given that this filter is designed to mitigate against channel conditions changing due to fading. It may also be desirable to dynamically change C based on an estimate of speed in the environment (during ongoing receipt and equalisation of the signal), e.g. by using an estimate of Doppler effect. This may involve allocating C some centre value such as 19/20 (e.g. corresponding to no movement) and then modulating around 19/20 in dependence on the Doppler estimate.

It will be appreciated that the above embodiments have been described only by way of example. For instance, whilst some of the embodiments above have been described in relation to adapting the equaliser length L in the time domain, in alternative embodiments the present invention can alternatively be used to vary the length of an equaliser window performed in the frequency domain; and/or the present invention can be used to vary the window over which the channel is taken to contribute to the initial calculation of the equaliser coefficients w for the purpose of equalising the signal. Either or both kinds of equaliser window (the length of the equaliser itself or the channel length used in the equaliser) can be adapted based on the measure of ray-distance variance disclosed herein. Further, where it is referred to variance, this is intended to cover any measure that can be used to represent the mathematical variance. For example, am equivalent to using the variance $\sigma^2$ directly is using the standard deviation $\sigma$, which can equally be used as the measure of variance. Similarly, where it is referred to an energy value this is intended to cover any value that can be used to represent energy, e.g. for a known size bin then power can also be used a kind of energy value to represent energy. In the implementation where the elements (equaliser, channel searcher or otherwise) are portions of software, they may be stored in any suitable non-transient storage device such as a permanent ROM, a flash memory, or a magnetic storage device; and may be implemented on any processor whether formed of a single execution unit or multiple execution units. The equaliser used could be any kind such as a type 3 or 3i equaliser of the 3GPP standards. Other variants may be apparent to a person skilled in the art given the disclosure herein. The invention is not limited by the described embodiments but only by the appendant claims.

The invention claimed is:

1. An apparatus for processing a signal received over a wireless channel, comprising:
   a channel searcher configured to determine a profile of the channel in the form of energy values for a plurality of rays at respective channel positions; and
   an equaliser for equalising the signal based on a variable window of the equaliser;
   wherein the channel searcher is configured to estimate dispersion of the channel by determining a measure of energy-weighted ray-distance variance, being a measure of variance of ray distance from a reference position within the channel profile weighted by ray energy, the equaliser is coupled to the channel searcher and arranged to adapt the window in dependence on said measure of energy-weighted ray-distance variance, and the apparatus further comprises a filter arranged to filter the measure of energy-weighted ray-distance variance, the filter having the form f¬m + 1 = C(fm + dm + 1) where fm+1 an updated state of the filter, fm is the state of the filter preceding the updated state, dm+1 is an updated measure of the energy-weighted ray-distance variance or energy centroid as appropriate, and C is a predetermined factor being less than one.

2. The apparatus of claim 1, wherein the reference position is a mid point of the channel profile.

3. The apparatus of claim 2, wherein the mid point is the energy centroid of the channel profile.

4. The apparatus of claim 1, wherein the equaliser is configured to adapt the window based on an approximated model that the energy of the channel follows a probability distribution having a predetermined form and being parameterised by said measure of energy-weighted ray-distance variance, the window corresponding to a width of the parameterised probability distribution beyond which less than a predetermined proportion of the channel energy falls.

5. The apparatus of claim 4, wherein the predetermined form is that of a Gaussian distribution.

6. The apparatus of claim 1, wherein the channel searcher and equaliser are configured to repeat said determination of channel profile, determination of energy-weighted ray-distance variance and adaptation of the window dynamically throughout ongoing receipt and equalisation of the signal so as to adapt the equaliser to changing channel conditions.

7. The apparatus of claim 1, wherein the channel searcher is configured to discard outlying rays from said profile before measuring the energy-weighted ray-distance variance.

8. The apparatus of claim 3, wherein the channel searcher is configured to discard outlying rays from said profile before measuring the energy centroid.

9. The apparatus of claim 1, wherein said filter is arranged to filter the measure of energy-weighted ray-distance variance before adapting the window.

10. The apparatus of claim 1, comprising a filter arranged to filter the energy centroid before used to determine said measure of energy-weighted ray-distance variance.

11. The apparatus of claim 1, wherein C is substantially equal to $19/20$.

12. The apparatus of claim 1, wherein C is dynamically adapted based on a Doppler estimate.

13. The apparatus of claim 1, wherein the channel searcher is arranged to determine the channel profile based on a convolution of the received signal with a pilot signal.

14. The apparatus of claim 1, comprising a non-transient storage medium and a processor, wherein the equaliser and channel searcher comprise program code stored on the non-transient storage medium and arranged for execution on the processor.

15. A method of processing a signal received over a wireless channel, comprising:
 determining a profile of the channel in the form of energy values for a plurality of rays at respective channel positions; and
 equalising the signal based on a variable window;
 estimating dispersion of the channel by determining a measure of energy-weighted ray-distance, being a measure of variance of ray distance from a reference position within the channel profile weighted by ray energy;
 filtering the measure of variance by using a filter of form $f_{m+1} = C(f_m + d_{m+1})$ where $f_{m+1}$ an updated state of the filter, $f_m$ is the state of the filter preceding the updated state, $d_{m+1}$ is an updated measure of the energy-weighted ray-distance variance or energy centroid as appropriate, and C is a predetermined factor being less than one; and
 adapting the window in dependence on said measure of variance.

16. The method of claim 15, wherein the reference position is a mid point of the channel profile.

17. The method of claim 16, wherein the mid point is the energy centroid of the channel profile.

18. The method of claim 15, wherein the window is adapted based on an approximated model that the energy of the channel follows a probability distribution having a predetermined form and being parameterised by said measure of energy-weighted ray-distance variance, the equalisation window corresponding to a width of the parameterised probability distribution beyond which less than a predetermined proportion of the channel energy falls.

19. The method of claim 18, wherein the predetermined form is that of a Gaussian distribution.

20. The method of claim 15, wherein said determination of channel profile, determination of energy-weighted ray-distance variance and adaptation of the equalisation window are repeated dynamically throughout ongoing receipt and equalisation of the signal so as to adapt the equalisation to changing channel conditions.

21. The method of claim 15, comprising discarding outlying rays from said profile before measuring the energy-weighted ray-distance variance.

22. The method of claim 17, comprising discarding outlying rays from said profile before measuring the energy centroid.

23. The method of claim 15, wherein said filtering the measure of variance is carried out before adapting the equalisation window.

24. The method of claim 15, comprising filtering the energy centroid before used to determine said measure of energy-weighted ray-distance variance.

25. The method of claim 15, wherein C is substantially equal to $19/20$.

26. The method of claim 15, comprising adapting C is dynamically based on a Doppler estimate.

27. The method of claim 15, wherein the channel profile is determined based on a convolution of the received signal with a pilot signal.

28. A computer program product for processing a signal received over a wireless channel, the computer program product comprising code embodied on a non-transient computer-readable medium and configured so as when executed on a processor to perform operations of:
 determining a profile of the channel in the form of energy values for a plurality of rays at respective channel positions; and
 equalising the signal based on a variable window;
 estimating dispersion of the channel by determining a measure of energy-weighted ray-distance, being a measure of variance of ray distance from a reference position within the channel profile weighted by ray energy;
 filtering the measure of variance by using a filter of form $f_{m+1} = C(f_m + d_{m+1})$ where $f_{m+1}$ an updated state of the filter, $f_m$ is the state of the filter preceding the updated state, $d_{m+1}$ is an updated measure of the energy-weighted ray-distance variance or energy centroid as appropriate, and C is a predetermined factor being less than one; and
 adapting the window in dependence on said measure of variance.

29. The computer program product of claim 28, wherein the reference position is a mid point of the channel profile.

30. The computer program product of claim 29, wherein the mid point is the energy centroid of the channel profile.

31. The computer program product of claim 28, wherein the code is configured so as when executed to adapt said window based on an approximated model that the energy of the channel follows a probability distribution having a predetermined form and being parameterised by said measure of energy-weighted ray-distance variance, the equalisation window corresponding to a width of the parameterised probability distribution beyond which less than a predetermined proportion of the channel energy falls.

32. The computer program product of claim 31, wherein the predetermined form is that of a Gaussian distribution.

33. The computer program product of claim 28, wherein the code is configured so as when executed to repeat said determination of channel profile, determination of energy-weighted ray-distance variance and adaptation of the equalisation window dynamically throughout ongoing receipt and equalisation of the signal so as to adapt the equalisation to changing channel conditions.

34. The computer program product of claim 28, wherein the code is configured so as when executed to discard outlying rays from said profile before measuring the energy-weighted ray-distance variance.

35. The computer program product of claim 30, wherein the code is configured so as when executed to discard outlying rays from said profile before measuring the energy centroid.

36. The computer program product of claim 28, wherein the code is configured so as when executed to filter the measure of variance before adapting the equalisation window.

37. The computer program product of claim 28, wherein the code is configured so as when executed to filter the energy centroid before used to determine said measure of energy-weighted ray-distance variance.

38. The computer program product of claim 28, wherein C is substantially equal to $19/20$.

39. The computer program product of claim 38, wherein the code is configured so as when executed to adapt C dynamically based on a Doppler estimate.

40. The computer program product of claim 28, wherein the code is configured so as when executed to determine the channel profile based on a convolution of the received signal with a pilot signal.

* * * * *